United States Patent
Sohma et al.

(10) Patent No.: US 9,229,159 B2
(45) Date of Patent: Jan. 5, 2016

(54) OPTICAL FIBER

(71) Applicant: SUMITOMO ELECTRIC INDUSTRIES, LTD., Osaka (JP)

(72) Inventors: Kazuyuki Sohma, Yokohama (JP); Yuya Homma, Yokohama (JP); Itaru Sakabe, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 40 days.

(21) Appl. No.: 13/861,649

(22) Filed: Apr. 12, 2013

(65) Prior Publication Data

US 2014/0079362 A1 Mar. 20, 2014

(30) Foreign Application Priority Data

Apr. 13, 2012 (JP) ................. 2012-091829

(51) Int. Cl.
*G02B 6/02* (2006.01)
*G02B 1/04* (2006.01)
*C03C 25/10* (2006.01)

(52) U.S. Cl.
CPC .......... *G02B 6/02395* (2013.01); *C03C 25/106* (2013.01); *G02B 1/04* (2013.01); *G02B 1/048* (2013.01)

(58) Field of Classification Search
CPC ...... G02B 1/048; G02B 1/04; G02B 6/02395; C08L 27/08; C08L 27/12; C08L 27/106
USPC ........... 385/123; 427/163.2; 428/378; 65/376
See application file for complete search history.

(56) References Cited

U.S. PATENT DOCUMENTS

| | | | | |
|---|---|---|---|---|
| 4,290,668 | A * | 9/1981 | Ellis et al. ...................... | 385/128 |
| 4,317,616 | A * | 3/1982 | Clarke ........................ | 385/145 |
| 4,583,851 | A * | 4/1986 | Yataki ......................... | 356/73.1 |
| 4,851,484 | A * | 7/1989 | Garton et al. ................. | 525/504 |
| 5,740,295 | A * | 4/1998 | Kinard et al. ................. | 385/109 |
| 7,323,535 | B2 * | 1/2008 | Berkstresser et al. ........ | 528/196 |
| 8,483,532 | B2 * | 7/2013 | Sohma et al. ................. | 385/123 |
| 8,693,832 | B2 * | 4/2014 | Nakamura et al. ............ | 385/123 |
| 2004/0062501 | A1 * | 4/2004 | Abel et al. .................... | 385/128 |
| 2004/0223716 | A1 * | 11/2004 | Kim et al. ..................... | 385/128 |
| 2004/0238979 | A1 * | 12/2004 | Yamano et al. .............. | 264/1.28 |
| 2006/0067638 | A1 * | 3/2006 | Chang et al. .................. | 385/145 |
| 2006/0084716 | A1 * | 4/2006 | Zahora et al. ................. | 522/178 |
| 2006/0264581 | A1 * | 11/2006 | Berkstresser et al. ........ | 525/439 |
| 2008/0161443 | A1 * | 7/2008 | Lee et al. ...................... | 522/78 |
| 2009/0208760 | A1 * | 8/2009 | Kuwahara et al. ............ | 428/428 |
| 2010/0108513 | A1 * | 5/2010 | Amirkhanian ................ | 204/452 |
| 2011/0182556 | A1 * | 7/2011 | Sohma et al. ................. | 385/123 |

(Continued)

FOREIGN PATENT DOCUMENTS

| | | |
|---|---|---|
| JP | A-S64-024203 | 1/1989 |
| JP | A-H03-107105 | 5/1991 |

(Continued)

*Primary Examiner* — Peter Radkowski
(74) *Attorney, Agent, or Firm* — Drinker Biddle & Reath LLP

(57) ABSTRACT

An optical fiber 1 comprising a core layer 2 composed of a silica based glass, a clad layer 3 formed on the outer circumference of the core layer 2 by curing a curable resin composition, and an ink layer 4 formed around the clad layer 3, wherein adhesive force between the core layer 2 and the clad layer 3 being from 1.5 g/mm to 4.0 g/mm.

2 Claims, 1 Drawing Sheet

(56) References Cited

U.S. PATENT DOCUMENTS

2012/0008907 A1* 1/2012 Nakamura et al. ............ 385/124
2012/0020637 A1* 1/2012 Maeda et al. ................ 385/145

FOREIGN PATENT DOCUMENTS

| | | | |
|---|---|---|---|
| JP | 03163505 A * | 7/1991 | |
| JP | 2000056191 A * | 2/2000 | ............... G02B 6/44 |
| JP | A-2004-021118 | 1/2004 | |
| JP | A-2004-83406 | 3/2004 | |
| JP | 2004198506 A * | 7/2004 | |
| JP | 2006201469 A * | 8/2006 | |
| JP | A-2007-017549 | 1/2007 | |
| JP | A-2009-198706 | 9/2009 | |
| JP | A-2011-107217 | 6/2011 | |
| JP | A-2011-154107 | 8/2011 | |
| WO | WO 9603609 A1 * | 2/1996 | |

* cited by examiner

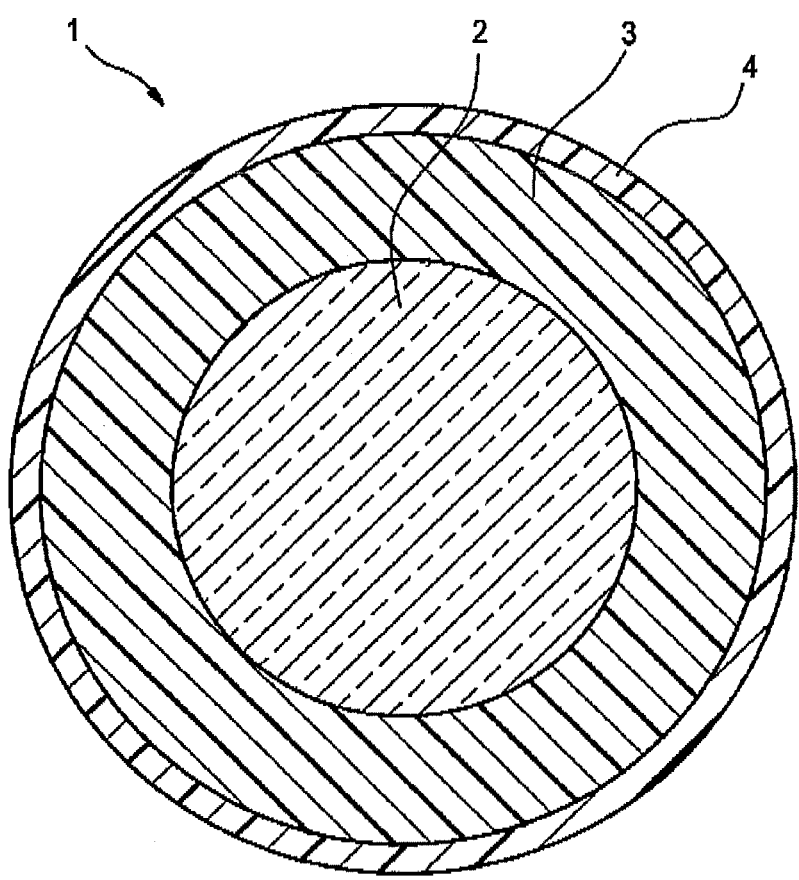

OPTICAL FIBER

This application claims priority from Japanese Patent Application No. 2012-091829, filed on Apr. 13, 2012, the entire contents of which are hereby incorporated by reference.

FIELD OF THE INVENTION

The present invention relates to an optical fiber having a core layer composed of silica glass and a clad layer composed of a resin and an ink layer on the outer circumference of the core layer.

DESCRIPTION OF RELATED ART

A plastic clad optical fiber that is one kind of optical fibers has a core layer composed of a silica-based glass such as pure silica and a clad layer composed of a plastic provided on the outer circumference of the core layer. The plastic clad optical fiber having such a structure is usually formed by forming a core layer of the optical fiber by drawing of a silica-based glass preform by means of a fiber drawing apparatus and subsequently applying a curable resin, which is to be a clad layer, on the outer circumference of the core layer by means of a coating die or the like, followed by curing the resin.

In the plastic clad optical fiber, when delamination occurs at an interface of the clad layer and the core layer, strength at that portion decreases. Such a partial decrease in strength by the delamination results in deterioration of the plastic clad optical fiber, such as crack in the core layer. Therefore, it is hitherto an important problem to maintain an adhesive force between the clad layer and the core layer. For example, in JP-A-2011-154107 discloses a plastic clad optical fiber which has an excellent adhesive force between the core layer and the clad layer.

SUMMARY OF INVENTION

An object of the invention is to provide an optical fiber having an appropriate peeling ability of an ink layer and exhibiting a small transmission loss of an optical signal.

There is a demand for coloring of the plastic clad optical fiber for the purpose of discrimination. For this purpose, it is considered to provide an ink layer further on the outer side of the clad layer. The ink layer is usually formed of a resin composition containing a coloring material such as a pigment.

However, when such a colored plastic clad optical fiber is fixed to a connector without further treatment, in the case where the connector undergoes a temperature change, there is a concern that slipping between the clad layer and the ink layer to protrude the clad layer and the core layer from an end face of the connector, so-called pistoning, may occur.

As methods for suppressing such pistoning, it is considered that adhesiveness between the clad layer and the ink layer is increased or, when fixing the optical fiber to the connector, the ink layer is removed to expose the clad and the exposed clad portion is fixed to the connector.

When the above two methods are compared, the increase of the adhesiveness between the clad layer and the ink layer in order to diminish the slipping between the clad layer and the ink layer is more difficult than the enhancement of peeling ability of the ink layer from the clad layer for the purpose of the fixing to the connector with exposing the clad portion, and thus is not practical.

The inventors of the present invention have directed their attention to the findings that, when the fluorine content in a resin composition for clad layer formation having a specific composition is controlled to an appropriate range, the peeling ability of the ink layer is satisfactory and a transmission gain of an optical signal increases due to the decrease of scattering loss of the optical signal.

An optical fiber of the invention comprises a core layer composed of a silica based glass, a clad layer formed on the outer circumference of the core layer by curing a curable resin composition, and an ink layer formed so as to come into contact with the outer circumference of the clad layer, wherein adhesive force between the core layer and the clad layer being from 1.5 g/mm to 4.0 g/mm.

the ink layer being formed of a composition containing a coloring pigment and an ultraviolet curable urethane (meth) acrylate compound, wherein the curable resin composition for forming the clad layer contains at least one compound selected from a fluorine atom-containing urethane (meth) acrylate, a (meth)acrylate compound having a fluorinated polyether in the structure, and a (meth)acrylated fluorine atom-containing vinyl polymer and further contains an alkoxysilane represented by the following general formula in an amount of 0.2 to 1 wt %, and fluorine content in the clad layer is from 20 to 60 wt %:

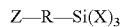
General formula:

wherein Z represents a (meth)acryl group, a mercapto group, or an epoxy group, X represents $-OCH_3$, $-OC_2H_5$ or $-OC_3H_7$, and R represents $C_nH_{2n}$, where n equals 1, 2, 3, 4, or 5.

The optical fiber of the invention is excellent in peeling ability of the ink layer and transmissibility of an optical signal.

BRIEF DESCRIPTION OF THE DRAWINGS

FIG. 1 is a schematic cross-sectional view showing an optical fiber 1 that is one example of the optical fiber according to an embodiment of the invention.

DETAILED DESCRIPTION OF EXEMPLARY EMBODIMENT

The following will describe the optical fiber according to an embodiment of the invention in detail with reference to FIG. 1.

FIG. 1 is a schematic cross-sectional view of an optical fiber 1 that is one example of the optical fiber according to an embodiment of the invention.

The optical fiber 1 has a clad layer 3 obtained by curing an ultraviolet curable resin on the outer circumference of a core layer 2 composed of a silica-based glass such as silica glass including additive and further an ink layer 4 formed so as to come into contact with the outer circumference of the clad layer.

For example, the outer diameter of the core layer 2 may be from 50 μm to 100 μm, the thickness of the clad layer 3 may be from 12 μm to 38 μm (outer diameter of the clad layer 3: 125 μm), and the thickness of the ink layer may be from 2 μm to 10 μm. Particularly in the case of the use for optical composite USB cables for household use or HDMI cables, in order to decrease a minimum allowed bend radius for easy handling, it is preferred to make the diameter relatively small, with controlling the outer diameter of the core layer 2 to from 50 μm to 90 μm, the thickness of the clad layer 3 to from 17 μm to 38 μm, and the thickness of the ink layer to from 3 μm to 8 μm.

Moreover, the adhesive force at the interface between the core layer 2 and the clad layer 3 is from 1.5 g/mm to 4.0 g/mm. By defining the adhesive force to the aforementioned value range, delamination of the core layer 2 from the clad layer 3 when an external force is imparted to the optical fiber 1 can be suppressed.

For example, in the case where bending strain is generated by the impartment of an external force to the optical fiber 1, shear stress is generated at an outer interface of the clad layer 3 and compressive stress is generated at an inner interface thereof at a bent portion in the optical fiber. Accordingly, a force to peel the clad layer 3 from the core layer 2 acts on the above bent portion of the optical fiber 1. Therefore, when the adhesive force at the interface is weak, delamination of the clad layer 3 occurs. Particularly, when the inner interface of the clad layer 3 that has covered the core layer is peeled off, at the said portion of the core layer 2, bending having a radius smaller than the other portion is generated. Since the clad layer 3 that should act as a cushioning material has been delaminated and a void has been formed, generation of minute cracks rapidly proceeds and a possibility of rupture increases.

Therefore, in order to suppress the rupture subsequent to the delamination of the clad layer 3 when bending stress is imparted, it is necessary to define the adhesive force at the interface to the above value range.

The clad layer 3 of the optical fiber 1 is formed by curing a curable resin composition.

The curable resin composition for forming the clad layer 3 of the optical fiber 1 contains at least one compound selected from a fluorine atom-containing urethane (meth)acrylate, a (meth)acrylate compound having a fluorinated polyether in the structure, and a (meth)acrylated fluorine atom-containing vinyl polymer (hereinafter also referred to as fluorine-contained ultraviolet curable resin) and further contains an alkoxysilane represented by the following general formula in an amount of 0.2 to 1 wt %, and the composition can make the fluorine content in the clad layer 3 from 20 to 60 wt %:

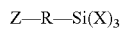

General formula: Z—R—Si(X)$_3$ wherein Z represents a (meth)acryl group, a mercapto group, or an epoxy group, X represents —OCH$_3$, —OCH$_2$H$_5$ or —OC$_3$H$_7$, and R represents C$_n$H$_{2n}$, where n equals 1, 2, 3, 4, or 5.

The fluorine atom-containing urethane (meth)acrylate can be, for example, obtained by reacting a fluorine atom-containing (meth)acrylate compound with a diisocyanate compound. The fluorine atom-containing (meth)acrylate compound having a fluorinated polyether in the molecular structure can be, for example, obtained by reacting a fluorine atom-containing (meth)alcohol compound with a fluorine atom-containing (meth)acrylate compound or acrylic acid.

By incorporating the alkoxysilane (a silane coupling agent) represented by the above general formula into the curable resin composition, the adhesive force defined in the above can be realized.

Moreover, in the curable resin composition, besides the above compounds, those usually used as forming materials for the clad layer 3 of the optical fiber 1 can be used. The example of the forming materials for the clad layer 3 of the optical fiber 1 includes a polymerizable unsaturated monomer such as N-vinylcaprolactam, the following photopolymerization initiators, and various additives.

Furthermore, as the components other than the above alkoxysilane in the curable resin composition, it is preferred to use those which affords a refractive index of 1.401 to 1.450 at the time when a curable composition obtained by mixing the components excluding the above alkoxysilane is cured ("components other than the alkoxysilane" used herein means polymerizable compounds, photopolymerization initiators, fluorine-contained ultraviolet curable resins, and the like which substantially participate the formation of the clad layer 3 (volatile solvents and the like to be added only for mere dissolution or the like are not included)). It has been confirmed that a curable resin composition exhibiting a refractive index in this range achieves both of excellent fiber strength and transmission properties (specifically, 1.401, 1.413, 1.430, and 1.450). When the refractive index exceeds 1.450, a difference in the refractive index between the clad layer and the core layer 2 is small and the case is not suitable for transmission of an optical signal. Moreover, when compatibility of the alkoxysilane with the fluorine-contained ultraviolet curable resin and the like to be a main material constituting the clad layer 3 decreases, the resin constituting the clad layer 3 becomes clouded, which causes a decrease in transmission properties. In the present curable resin composition, by controlling the refractive index of the curable composition obtained by mixing the components of the clad layer 3 other than the alkoxysilane to the above numeral range, the compatibility of the fluorine-contained ultraviolet curable resin and the like to be a main material constituting the clad layer 3 with the above alkoxysilane is secured.

In the curable resin composition, the alkoxysilane represented by the above general formula (I) is contained in an amount of 0.2 to 1 wt % in the curable resin composition. In the curable resin composition that forms the clad layer 3, by incorporating the alkoxysilane represented by the general formula (I) in the above numeral range, a decreasing amount of a dynamic contact angle for a period of initial one second before curing of the curable resin composition can be made large, that is, the curable resin composition and the core layer 2 become compatible each other for a short period of time, the adhesive force between the clad layer 3 to be formed and the core layer 2 can be remarkably improved. When the amount of the alkoxysilane represented by the above general formula (I) to be added is less than 0.2 wt %, the effect of improving the adhesive force is not obtained. On the other hand, when the amount exceeds 1 wt %, the fiber strength is improved but the compatibility of the alkoxysilane represented by the general formula (I) with the fluorine-contained ultraviolet curable resin decreases and there is a concern that the transmission properties may decrease since the resin becomes clouded.

As the photopolymerization initiator in the curable resin composition, any known photopolymerization initiator may be employed but a good storage stability after blending is required. Specific examples of such a photopolymerization initiator include 2-hydroxy-2-methyl-1-phenylpropan-1-one.

In the optical fiber 1, the clad layer 3 formed by curing the curable resin composition as mentioned above has a fluorine content of 20 to 60 wt %.

When the fluorine content in the clad layer 3 is less than 20 wt %, the peeling ability between the clad layer 3 and the ink layer 4 decreases and thus the ink layer 4 becomes difficult to remove. When the fluorine content in the clad layer 3 exceeds 60 wt %, the compatibility of the fluorine-contained ultraviolet curable resin with the alkoxysilane becomes worse, so that the clad layer 3 becomes clouded, an optical signal cannot be transmitted, and the transmission loss increases.

Moreover, in the optical fiber 1, the adhesive force between the clad layer 3 and the ink layer 4 is preferably from 0.1 to 0.4 g/mm.

The ink layer 4 of the optical fiber 1 is formed so as to come into contact with the outer circumference of the clad layer 3.

The ink layer 4 is formed of a composition containing a coloring pigment and an ultraviolet curable urethane (meth) acrylate compound.

The ultraviolet curable urethane (meth)acrylate compound is not particularly limited but is, for example, preferably a urethane (meth)acrylate obtained by reacting
(a) an alkylene oxide adduct of bisphenol A or bisphenol F,
(b) a diisocyanate, and
(c) a hydroxyl group-containing (meth)acrylate compound.

Examples of the alkylene oxide adduct of bisphenol A (2,2-bis(4'-hydroxyphenyl)propane) or bisphenol F (bis(4-hydroxyphenyl)methane) of the above component (a) include adducts of ethylene oxide, propylene oxide, butylene oxide, or the like. The number of moles of the alkylene oxide to be added is preferably from 1 to 15 moles per mole of bisphenol A or bisphenol F.

Examples of the diisocyanate of the component (b) include tolylene diisocyanate (TDI), hexamethylene diisocyanate (1-HDI), diphenylmethane diisocyanate (MDI), hydrogenated diphenylmethane diisocyanate (hydrogenated MDI), and isophorone diisocyanate (IPDI).

Examples of the hydroxyl group-containing (meth)acrylate compound of the component (c) include 2-hydroxyethyl (meth)acrylate and 2-hydroxypropyl(meth)acrylate. Of these, from the viewpoint of improving the curing rate of a composition to be obtained for ink layer formation, particularly an acrylate compound is preferred as compared with a methacrylate compound.

Examples of the methods of reacting these components (a) to (c) include (1) a method of adding the component (b), the component (a), and the component (c) or the component (b), the component (c), and the component (a) in the order, (2) a method of reacting the both components (a) and (b) and subsequently adding the component (c), and (3) a method of reacting the components (a), (b), and (c) simultaneously, usually at from 20 to 60° C. in the presence of a catalyst. Examples of the catalyst include tertiary amines such as triethylamine and organotin compounds such as dibutyltin dilaurate. The urethane (meth)acrylate thus obtained is, for example, represented by the following general formula (II).

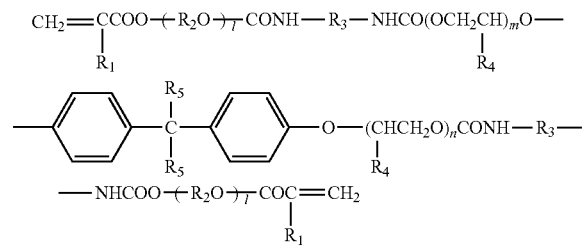

(II)

wherein $R_1$ and $R_5$ represent each a hydrogen atom or a methyl group, $R_2$ represents an alkylene group having 1 to 6 carbon atoms, $R_3$ represents a diisocyanate residue, $R_4$ represents a hydrogen atom, a methyl group, or an ethyl group, $l$ represents an integer of 1 to 10, and $m$ and $n$ represent each an integer of 1 to 30.

In the general formula (II), examples of the alkylene group having 1 to 6 carbon atoms represented by $R_2$ include a methylene group, an ethylene group, a propylene group, a butylene group, a pentamethylene group, and a hexamethylene group. Moreover, $l$ is an integer of 1 to 10 but is particularly preferably an integer of 1 to 4, and m and n are each an integer of 1 to 30 but are each particularly preferably an integer of 1 to 15.

The urethane (meth)acrylate represented by the general formula (II) is an ethylene oxide (or propylene oxide or butylene oxide)-modified bisphenol F (or A) urethane acrylate. Examples of commercially available products thereof include NK Ester U-1301A (manufactured by Shin-Nakamura Chemical Co., Ltd.), NK Ester U-701A (manufactured by Shin-Nakamura Chemical Co., Ltd.), NK Ester U-401A (manufactured by Shin-Nakamura Chemical Co., Ltd.), NK Ester U-601BA (manufactured by Shin-Nakamura Chemical Co., Ltd.), and NK Ester U-1001BA (manufactured by Shin-Nakamura Chemical Co., Ltd.). These urethane (meth)acrylates can be blended into the composition for ink layer formation in an amount of usually from 5 to 80 wt %, preferably from 5 to 70 wt %.

Besides the above urethane (meth)acrylates, various kinds of ultraviolet curable resins can be used in combination. Examples of the ultraviolet curable resins include those obtained from an acrylate oligomer such as any of various epoxy acrylate resins and polyester acrylate resins and a monofunctional or polyfunctional monomer having an ethylenic unsaturated group, such as neopentyl glycol acrylate, N-vinylpyrrolidone, or pentaerythritol triacrylate. These resins can be blended into the composition for ink layer formation in an amount of usually from 0 to 90 wt %, preferably from 20 to 80 wt %.

Moreover, a coloring pigment, a photopolymerization initiator, and the like are blended into the composition for ink layer formation.

Examples of the coloring pigment include carbon black, titanium oxide, zinc white, insoluble azo pigments, condensed azo pigments, and polycyclic pigments. These coloring pigments can be blended into the composition for ink layer formation in an amount of usually from 0.1 to 50 wt %, preferably from 2 to 10 wt %.

Examples of the photopolymerization initiator include radical photopolymerization initiators such as benzophenone, benzoin, benzoin isobutyl ether, benzil, benzoin ethyl ether, 2,2-dimethoxy-2-phenylacetophenone, xanthone, fluorenone, 4-chlorobenzophenone, triphenylamine, carbazole, 3-methylacetophenone, 4,4'-dimethoxybenzophenone, 4,4'-di aminobenzophenone, Michler's ketone, benzoin propyl ether, acetophenone diethyl ketal, 1-hydroxycyclohexyl phenyl ketone, 4'-isopropyl-2-hydroxy-2-methyl-propiophenone, 2-hydroxy-2-methyl-propiophenone, α,α'-dichloro-4-phenoxyacetophenone, benzil dimethyl ketal, 2,2-diethoxyacetophenone, chlorothioxanthone, 2-isopropylthioxanthone, diethylthioxanthone, 3,3-dimethyl-4-methoxybenzophenone, 2-methyl-1-[4-(methylthio)phenyl]-2-morpholinopropanone, α-hydroxycyclohexyl phenyl ketone, Ebecryl P36 (registered trade mark) (polymerized benzophenone manufactured by UCB), and 2,4,6-trimethylbenzoyldiphenylphosphine oxide; and ionic photopolymerization initiators such as 2,5-diethoxy-4-(p-tolylmercapto)benzenediazonium $PF_6^-$, 2,4,6-trichlorobenzenediazonium $PF_6^-$, 4-dimethylaminonaphthalenediazonium $PF_6^-$, and cyclopentadienylferrocenium $PF_6^-$. These photopolymerization initiators can be blended into the composition for ink layer formation in an amount of usually from 0.5 to 20 wt %, preferably from 3 to 10 wt %.

Furthermore, n-butylamine, tri-n-butylphosphine, S-benzylisothiuronium-R-toluenesulfonate, triethylamine, diethylaminoethyl(meth)acrylate, hydroquinone monomethyl ether, p-dimethylaminobenzoic acid ethyl ester, 2,6-di-t-butyl-p-methylphenol, and the like, which are a photosensitizer, a storage stabilizer, a leveling agent, or an ultraviolet absorbent, can be blended according to need.

The composition for ink layer formation can be produced by mixing the above components in a usual manner. The ink layer 4 can be formed on the optical fiber 1 by applying the composition on the clad layer 3 of the optical fiber 1 and subsequently curing the composition by irradiation with an ultraviolet ray by means of a high-pressure mercury lamp, a metal halide lamp, or the like.

The adhesive force between the core layer and the clad layer can be measured as follows.

A curable composition for forming the clad layer is applied on a sheet glass (a large slide glass, 76×52 mm) by spin coating so as to be a thickness of 10 μm and is cured by irradiation with a UV light of 100 mJ/cm$^2$ to form a resin film on the sheet glass.

After standing at ordinary temperature for a whole day and night or more, a cut is made into the resin film and the resin film is peeled by 1 cm. The end of the resin film is pinched with a chuck of a tension tester and then 90° peeling strength is measured. For the measurement, a load cell of 50 N is used and a tensile rate is controlled to 100 mm/min. A value obtained by dividing a force required for peeling by the sample width is taken as the adhesive force.

The adhesive force between the clad layer and the ink layer can be measured as follows.

A curable composition for forming the clad layer is cured so as to be a thickness of 130 μm to form a resin film. Then, an ink layer is formed on the film by spin coating so as to be a thickness of 10 μm and is cured by irradiation with a UV light of 20 mJ/cm$^2$ to form a resin film of the ink layer on the resin film of the clad layer.

After standing at ordinary temperature for a whole day and night or more, the resin film of the ink layer is peeled by 1 cm. The end of the resin film of the ink layer is pinched with a chuck of a tension tester and then 90° peeling strength is measured. For the measurement, a load cell of 10 N is used and a tensile rate is controlled to 50 mm/min. A value obtained by dividing a force required for peeling by the sample width is taken as the adhesive force.

EXAMPLES

The following will describe the optical fiber according to the invention further in detail with showing results of evaluation tests using Examples and Comparative Examples. However, the optical fiber according to the invention is not limited to these Examples.

[Preparation of Optical Fiber]

A clad layer was formed on the outer circumference of a core layer having an outer diameter of 80 μm composed of a silica-based glass so as to be an outer diameter of 125 μm with a curable resin composition for clad layer formation having the following composition and then an ink layer was formed on the outer circumference of the clad layer so as to be an outer diameter of 135 μm with a composition for ink layer formation having the following composition, thereby preparing an optical fiber (Examples 1 and 2, Comparative Examples 1 and 2). Fluorine content (fluorine atom content) in each compound were different among the Examples.

[Curable Resin Composition for Clad Layer Formation]

| | |
|---|---|
| Fluorine atom-containing urethane (meth)acrylate compound | 30 wt % |
| 3-Acryloxypropylmethyltrimethoxysilane | 0.36 wt % |
| Photopolymerization initiator Lucirin TPO (manufactured by BASF) | 2 wt % |
| Acrylic acid | 3.6 wt % |
| Polyfunctional acrylic monomer (pentaerythritol tetramethacrylate) | 40 wt % |
| Fluorine-contained monomer (Biscoat 17F; 2-perfluorooctylethyl (meth)acrylate, manufactured by Osaka Organic Chemical Industry, Ltd.) | 25 wt % |

[Composition for Ink Layer Formation]

| | |
|---|---|
| Urethane acrylate (NK Ester U-1301A manufactured by Shin-Nakamura Chemical Co., Ltd.) | 60 parts by weight |
| Neopentyl glycol diacrylate (NPGOA manufactured by Nippon Kayaku Co., Ltd.) | 40 parts by weight |
| Photopolymerization initiator (Irgacure 907 manufactured by Ciba-Geigy) | 5 parts by weight |
| Blue pigment (phthalocyanine blue 2CA104 manufactured by Dainichiseika Color & Chemicals Mfg. Co., Ltd.) | 6 parts by weight |

[Evaluation of Optical Fiber]

For the prepared optical fibers, removing ability of the ink layer and transmissibility of an optical signal were evaluated. The evaluation methods for the removing ability of the ink layer and an optical signal transmission are as follows. Results are shown in the following Table 1.

[Removing Ability of Ink Layer]

Evaluation Method and Judgment Criteria

Using an optical fiber-removing tool (for usual 125 μm glass fibers, herein FO103-S manufactured by RIPLEY Co.), a test of removing only the ink layer was performed with N=20. Upon removal, the layer was removed with tilting the removing tool by about 45° toward the near side and, after the fiber surface was lightly washed with alcohol, the surface of the clad resin layer of the optical fiber was observed. At this time, the presence of abnormality such as scratches, resin delamination, ink residue, and the like was checked. The case where no abnormality was observed in the all number of the samples (N=20) was evaluated as being qualified (judgment of good) and the case where abnormality was found even in one sample was evaluated as being disqualified (judgment of bad).

[Transmission Loss of Optical Fiber]

Evaluation Method and Judgment Criteria

The transmission loss was measured by a cutback method. A section on one end side of a commercially available GI fiber (NA=0.29) having a clad diameter of 125 μm and a section on one end side of HPCF to be measured were faced each other. A light from a light source was allowed to enter at another end of the GI fiber and another end of the fiber HPCF to be measured was connected to a light intensity meter. With regard to the light from the light source, by sweeping the wavelength with passing a white light through a monochromater, an intensity spectrum (P'(λ)) of the outgoing light from HPCF was measured. Subsequently, the fiber was cut at the position of 1 m from the end of HPCF connected to the GI fiber and the cut end portion was connected to the light intensity meter and the intensity spectrum of the outgoing light was similarly measured (P(λ)). A transmission loss spectrum was measured by dividing the difference between (P'(λ)) and (P(λ)) by the distance of the optical fiber to be measured to determine transmission loss at a wavelength of 850 nm. The case where the transmission loss at a wavelength of 850 nm is larger than 15 dB/kin or an abnormal spectrum component was observed was evaluated as being disqualified (judgment of bad) and the case where the transmission loss at a wavelength of 850 nm is 15 dB/km or less or any abnormal spectrum component was not observed was evaluated as being qualified (judgment of good).

TABLE 1

|  | Comparative Example 1 | Example 1 | Example 2 | Comparative Example 2 |
|---|---|---|---|---|
| Fluorine atom content in clad (wt %) | 18 | 20 | 60 | 62 |
| Removing ability of ink layer | bad | good | good | good |
| Transmission loss (wavelength of 850 nm) | good | good | good | bad |

From the above results, it is confirmed that both of the removing ability of the ink layer and an optical signal transmission can be achieved by controlling the fluorine atom content in the clad layer to the range of 20 to 60 wt %.

What is claimed is:

1. An optical fiber comprising a core layer composed of a silica based glass, a clad layer formed on the outer circumference of the core layer by curing a curable resin composition, and an ink layer formed so as to come into contact with the outer circumference of the clad layer,
   wherein adhesive force between the core layer and the clad layer is from 1.5 g/mm to 4.0 g/mm,
   wherein the ink layer is formed of a composition containing a coloring pigment and an ultraviolet curable urethane (meth)acrylate compound,
   wherein the curable resin composition for forming the clad layer contains at least one compound selected from a fluorine atom-containing urethane (meth)acrylate, a (meth)acrylate compound having a fluorinated polyether in the structure, and a (meth)acrylated fluorine atom-containing vinyl polymer,
   wherein fluorine content in the clad layer is from 20 to 60 wt %,
   wherein the curable resin composition further contains an alkoxysilane represented by the following general formula in an amount of 0.2 to 1 wt %, Z—R—Si(X)₃   General formula:

wherein Z represents a (meth)acryl group, a mercapto group, or an epoxy group, X represents —OCH₃ or —OC₂H₅, and R represents C_nH_{2n}, where n equals 2, 3, 4, or 5,
   wherein the ink layer is formed as an outermost layer, and
   wherein adhesive force between the clad layer and the ink layer is from 0.1 to 0.4 g/mm.

2. The optical fiber according to claim 1, wherein a thickness of the ink layer is from 3 μm to 8 μm.

* * * * *